Patented Jan. 12, 1932

1,840,363

UNITED STATES PATENT OFFICE

RUDOLF ILLNER AND CAMILLO FÜRST, OF VIENNA, AUSTRIA; CLARA FÜRST ADMINISTRATRIX OF SAID CAMILLO FÜRST, DECEASED

PROCESS FOR ALTERING THE PHYSICAL PROPERTIES OF FINELY DIVIDED MINERAL SUBSTANCES

No Drawing. Application filed October 4, 1929, Serial No. 397,443, and in Austria December 13, 1928.

This invention relates to a process for altering the physical properties of finely divided mineral substances. Such substances which, in general, are chemically indifferent and find application in various branches of industry, e. g. in paper making, in the textile industry, or as fillers or colouring matters in the production of rubber goods and artificial masses, frequently show, in spite of true chemical combination, inadequate physical properties with regard to colour, uniform distribution in liquids, settling and the like, which offer difficulties in respect of their employment.

According to the invention the desired alteration of the physical properties of finely divided mineral substances is effected by suspending the finely divided mineral substances in a liquid and causing the small particles to adsorb one or several slightly soluble substances which are preferably salts. These salts may be formed by double decomposition of their components in the liquid in which the mineral substance is suspended.

Since one of the most important of the aforesaid mineral substances is kaolin, which, as is known, finds application in large quantities in the paper and textile industries as a filler and for the purpose of coating in the preparation of shiny types of paper, the invention will be described, for the purpose of explanation, with reference to the treatment of kaolin without being limited thereto. Kaolin does not always, as may be imagined, prove to be suitable for the purposes for which it is to be used, especially if it is required to have fixed properties which are present only in the kind of kaolin found in England and known in commerce as china clay. Such properties are that the kaolin should be easily stirrable with water to give a perfectly uniform paste and in dilute aqueous suspension should have a definite settling velocity, whereby a kaolin of pure white tone may be obtained. Moreover, in paper making, a definite behaviour of the kaolin is required towards the size, casein or the like, with which materials certain kaolins are mixed in coating papers. Kaolins which are found in deposits outside England never show the required physical properties, even when their chemical composition agrees with that of English kaolin.

This invention renders it possible to improve kaolin of any origin so much, that in respect of its physical properties and its behaviour for use in the paper and textile industries it is equal to English china clay. This alteration in the properties of the ordinary kaolins is obtained according to this invention by suspending them in water and allowing a slightly soluble salt to be adsorbed upon the particles of kaolin. On account of its small solubility in water the adsorbed salt remains adhering to the suspended kaolin particles when they are separated from the liquid. It is advantageous, in the practical use of the improved natural product, if the salt concerned is not quite insoluble, for a small part of the adsorbed salt to go into solution, the charge on the ions resulting in an electro-static charge on the solid particles in the medium, which is the cause of the desired physical behaviour observed.

This structure is attained by the kaolin particles, by the adsorption of comparatively slightly soluble salts, the said salts themselves being formed in an aqueous suspension of kaolin. Any appropriate substances such as acids, bases, salts, may be added to the suspension, which owing to their mutual action, allow a suitable salt to be formed. In choosing the added materials, regard should be had as to whether the kaolin, after its purification by an elutriation process, is to be coagulated in an acid, alkaline or neutral medium. For example, if a kaolin slurry has been coagulated with milk of lime, its suspension is treated with sulphuric acid until its reaction is neutral. Thereby calcium sulphate is formed, a part of which is adsorbed upon the kaolin particles, a part goes into solution, whilst the rest is precipitated.

A material may be employed as a reaction component, which in addition to promoting the above mentioned salt formation, also brings about a bleaching action, e. g. sodium hydrosulphite, whereby the strongly coloured ferric salts are converted into the slightly coloured ferrous salts, these are more easily soluble and remain dissolved, without adhering to the mineral particles. The colour of the purified kaolin may also be corrected by a blue dyestuff such as indanthrene blue or the like.

The reducing agent can also effect the formation of calcium sulphate, in which case the procedure is as follows:

Sodium hydrosulphite is added to kaolin suspended in slightly acidified water and part of the former is oxidized to sodium bisulphate by the aforesaid ferric salts. The excess sodium hydro-sulphite may be oxidized by blowing air or other oxygen-containing gas through the mixture, the action taking place in the presence of a catalyst, e. g. quite a small quantity of sodium nitrate can be used. Calcium hydroxide is then added until the acid reaction is very slight, in order to cause the formation of calcium sulphate. To correct the colour of the purified kaolin a brightening with an insoluble blue dyestuff, such as indanthrene or other vat dye, can follow. The addition of these dyestuffs may also be made after the addition of the aforesaid reducing agent, which thus reduces and makes them water-soluble, in which condition the dyestuff in a finely divided form is adsorbed quite uniformly by the kaolin particles and is regenerated on oxidation of the reducing agent.

The following examples illustrate how the process of this invention may be carried into effect:

1. A kaolin slurry was obtained from the crude kaolin of an Austrian deposit by mechanical elutriation and coagulated by means of milk of lime. This kaolin had a specific gravity of 1.3 and was neutralized in a mixing vessel with sulphuric acid of 60° Bé. Then about 0.1% of powdered sodium hydrosulphite calculated on the quantity of dry substance present, and double this weight of sulphuric acid of 60° Bé. were added, whereupon the mixture was stirred for 30–60 minutes. It was then neutralized with milk of lime and an excess of 0.1% of quicklime in the form of milk of lime, reckoned on the dry kaolin substance, added, and the mixture again stirred for 30–60 minutes. A ready made, perfectly stable suspension of indanthrene was then added. The quantity of the colouring matter was adjusted according to the desired tone and varied between 0.025% and 0.05% on the kaolin substance. After again stirring for 30 to 60 minutes the slurry was pressed in a filter press and finally dried by the application of heat.

2. A kaolin slurry was obtained from the crude kaolin of an Austrian deposit by mechanical elutriation and coagulated with aluminium sulphate. This kaolin had a specific gravity of 1.35 and was mixed in a mixing vessel with 0.1% of hydrosulphite calculated on the dry substance present and an equal quantity of sulphuric acid of 60° Bé., whereupon it was stirred for 30–60 minutes. Then it was neutralized with milk of lime and further treated as described in Example 1.

3. Kaolin slurry of sp. gr. 1.3 elutriated in the usual way and coagulated with 1 to 2 parts per 1000 of slaked lime, was acidified with sulphuric acid. Then 1–2 % of sodium hydrosulphite was added, well stirred, and air blown through the mass, the action being assisted by the addition of quite a small quantity of nitrate as catalyst, e. g. about 10 grms. sodium nitrate to 10,000 kgm. of kaolin. In this way the excess of $SO_3$ ion was oxidized, whereupon slaked lime was added until the acid reaction was very slight, whereby the soluble ferrous and ferric salts remain in solution.

If, after this process, the colour of the kaolin is still not that which is desired, it may be brightened with an organic dyestuff which is fast to alkali and acid, e. g. an indanthrene dye. The quantity of such dyestuff added may be adjusted according to the inherent colour of the kaolin and according to the tone to be obtained.

By the above described process calcium sulphate is formed. On the one hand the adsorption by the kaolin particles is lowered owing to the reduction and solution of the iron particles in the acid while on the other hand these particles become covered with a white layer and thereby become lighter in colour.

What we claim is:—

A process for altering the physical properties of kaolin which consists in first coagulating crude kaolin with milk of lime, then neutralizing the same with sulphuric acid of 60° Bé., then adding powdered sodium hydrosulfite in the proportion of about 1 part to 1000 parts of dry kaolin present, together with about 2 parts of sulfuric acid of 60° Bé. while stirring the mixture for 30 to 60 minutes; thereupon neutralizing the mixture with milk of lime having an excess of 1 part of quick lime to 1000 parts of dry kaolin, then again stirring the mixture for about the same length of time; then adding 0.025% to 0.05% of coloring matter, then again stirring the mixture and finally pressing and drying the same.

In testimony whereof we affix our signatures.

RUDOLF ILLNER.
CAMILLO FÜRST.